United States Patent
Tanner

(10) Patent No.: US 9,403,644 B2
(45) Date of Patent: Aug. 2, 2016

(54) ADJUSTING SYSTEM

(71) Applicant: M. Tanner AG, Illnau (CH)

(72) Inventor: Marcel Tanner, Bassersdorf (CH)

(73) Assignee: M. TANNER AG, Illnau (CH)

( * ) Notice: Subject to any disclaimer, the term of this patent is extended or adjusted under 35 U.S.C. 154(b) by 0 days.

(21) Appl. No.: 14/484,936

(22) Filed: Sep. 12, 2014

(65) Prior Publication Data

US 2015/0101909 A1 Apr. 16, 2015

(30) Foreign Application Priority Data

Sep. 16, 2013 (CH) ..................................... 1587/13

(51) Int. Cl.
| | | |
|---|---|---|
| *B65G 21/00* | (2006.01) | |
| *B65G 37/00* | (2006.01) | |
| *B65G 47/14* | (2006.01) | |
| *B65G 11/12* | (2006.01) | |
| *B29C 49/42* | (2006.01) | |
| *B29C 49/06* | (2006.01) | |

(52) U.S. Cl.
CPC .............. *B65G 37/00* (2013.01); *B65G 11/123* (2013.01); *B65G 47/1492* (2013.01); *B29C 49/06* (2013.01); *B29C 49/4205* (2013.01); *B29C 2049/4231* (2013.01); *B65G 2201/0247* (2013.01)

(58) Field of Classification Search
CPC ............... B65G 11/123; B65G 37/005; B65G 47/1492; B29C 49/4205
USPC .............. 198/550.01, 550.2, 435, 861.3, 786, 198/836.3; 193/2 A, 25 FT, 38, 41; 222/281
See application file for complete search history.

(56) References Cited

U.S. PATENT DOCUMENTS

| | | | | |
|---|---|---|---|---|
| 2,687,203 A | * | 8/1954 | Ladewig | .................. B08B 9/44 |
| | | | | 193/38 |
| 4,244,459 A | * | 1/1981 | Garrett | ............... B65G 47/1492 |
| | | | | 198/389 |
| 5,135,435 A | * | 8/1992 | Rasmussen | ............ G07D 9/065 |
| | | | | 198/626.3 |
| 6,227,377 B1 | * | 5/2001 | Bonnet | .................. B65G 21/12 |
| | | | | 198/435 |
| 7,735,636 B2 | * | 6/2010 | Lundberg | ............ B65G 21/2072 |
| | | | | 198/465.4 |

FOREIGN PATENT DOCUMENTS

| | | |
|---|---|---|
| DE | 10 2009 016593 | 10/2010 |
| EP | 1925 575 A1 | 11/2007 |

OTHER PUBLICATIONS

Search Report for Switzerland Application No. 1587/2013 filed on Sep. 16, 2013 (Jan. 13, 2014).

* cited by examiner

*Primary Examiner* — William R Harp
(74) *Attorney, Agent, or Firm* — Notaro, Michalos & Zaccaria P.C.

(57) ABSTRACT

A system for adjusting at least the vertical setting between a first transport device and a second transport device in a transport section for preforms for plastic containers. The first transport device has at least one outlet unit for accepting preforms from the second transport unit and a rail unit for further transport of the preforms, the outlet unit firstly being connected to the rail unit and secondly being arranged such that it can be moved freely with respect to the second transport device. Furthermore, the first and the second transport devices are connected to one another via an adjusting unit, it being possible for the height of at least the outlet unit to be adjusted with respect to the second transport device by the adjusting unit.

9 Claims, 4 Drawing Sheets

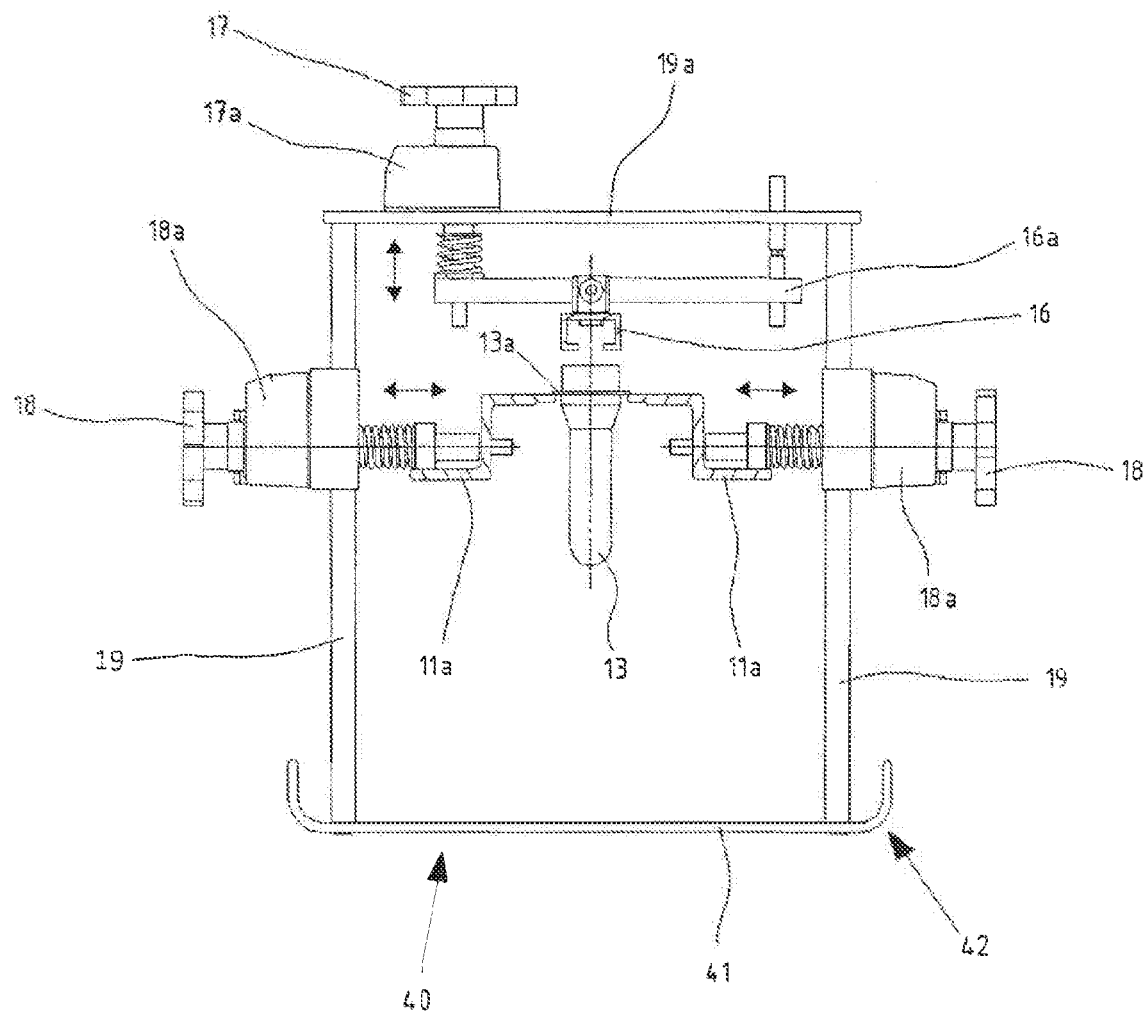

ADJUSTING SYSTEM

FIELD AND BACKGROUND OF THE INVENTION

The invention relates to a system for adjusting at least the vertical setting between a first transport device, for instance a running rail, and a second transport device, for instance a roller sorter, in a transport section for preforms for plastic containers.

An exemplary transport section for preforms for, for instance, PET bottles is described in EP 1 925 575 A1.

Up to now, that end of the running rail which faces the roller sorter was connected fixedly to the roller sorter in a cross guide. That is to say, an installer had to manually release the cross guide, reset it and tighten it again with the aid of a tool for each size or type change of the preforms. This led to significant changeover or down times of the entire system. Moreover, very fine tuning was required for the transition range from the roller sorter to the running rail, in order that the preforms do not wobble or become wedged here and block one another. There is still a requirement for readily reproducible fine tuning in this region.

SUMMARY OF THE INVENTION

It is therefore the object of the present invention to provide an adjusting system, by way of which a rapid, reliable but at the same time also accurate changeover from one preform size or type to another is made possible.

In accordance with the present invention, this object is achieved by way of a system for adjusting at least the vertical setting between a first transport device and a second transport device in a transport section for preforms for plastic containers, the first transport device having at least one outlet unit for accepting preforms from the second transport unit and a rail unit for further transport of the preforms, the outlet unit firstly being connected to the rail unit and secondly being arranged such that it can be moved freely with respect to the second transport device, and the first and the second transport devices being connected to one another via an adjusting unit, it being possible for the height of at least the outlet unit to be adjusted with respect to the second transport device by means of the adjusting unit.

The wording that the outlet unit is arranged such that it can be moved freely with respect to the second transport device means in the present case that it does not quite touch the second transport apparatus, but reaches close enough to the latter, in order to ensure a disruption-free transition of the preforms from the second transport device onto the outlet unit.

In one preferred embodiment of the present invention, the outlet unit of the first transport device has a curvature. The inclination angles of the first transport device and the second transport device which are different in an operation-induced manner are compensated for particularly efficiently by means of said curvature. The first transport device (for example, a running rail) as a rule has a greater inclination than the second transport device (for example, a roller sorter), in order possibly to aid detaching of the preforms from one another and thus to make it possible to design the separation to be more efficient overall. In addition, the preforms which optionally fall from the rollers or rolls of the roller sorter onto the outlet unit can thus be conveyed further on the outlet unit in a practically non-disrupted and wobble-free manner.

In a further preferred embodiment of the present invention, the adjusting unit has a movable carriage which is connected, preferably screwed, to the first transport unit. Here, the first transport device particularly preferably has a support profile which is optionally installed above the rail unit and to which the movable carriage is connected, preferably screwed. Here, the support profile is advantageously configured in the form of a C-profile. The support profile serves, in particular, to stabilize the rail unit which consists substantially only of two Z-profiles.

The movable carriage is particularly preferably mounted on at least one guide bar of the adjusting unit. The movable carriage can further preferably be moved along the at least one guide bar via an adjusting screw. As a result of the above-mentioned measures, the contact-free arrangement of the outlet unit on the second transport device or the roller sorter and their adjustment can be achieved in a structurally simple and reliable way.

Otherwise, the adjusting screw is preferably provided with or coupled to a digital display apparatus, in order for it to be possible to perform the necessary fine adjustment (usually in the range of a few millimeters or tenths of millimeters) precisely. In another preferred embodiment, the adjusting screw and the digital display apparatus can be configured in such a way that a latching step is overcome by each adjustment by a millimeter or $1/10$ of a millimeter, with the result that the machine operator also receives acoustic and possibly haptic feedback.

However, the adjusting screw of the adjusting unit particularly preferably runs between two guide bars, along which the movable carriage is moved. To this extent, it has proven expedient if the movable carriage has a substantially H-shaped configuration. Two small plates further preferably protrude from the underside of the transverse bar of the movable carriage, by means of which small plates the movable carriage is connected, preferably screwed, to the support profile.

In a further preferred embodiment of the present invention, the first transport unit has an adjustable vertical guide. The vertical guide preferably has an adjusting screw which is preferably once again provided with or coupled to a digital display apparatus (in the millimeter or $1/10$ millimeter range). The adjusting screw and the digital display apparatus can be configured in another preferred embodiment in such a way that a latching step is overcome by each adjustment by a millimeter or $1/10$ of a millimeter, with the result that the machine operator also receives acoustic and possibly haptic feedback.

In yet another preferred embodiment of the present invention, the first transport device has a width setting means (for instance in the form of an adjusting screw) which is preferably likewise provided with or coupled to a digital display apparatus. For disruption-free further conveying of the preforms, the width of the running rail also has to likewise be capable of being set in a very precise manner to the width of the respective preform size or type. In another preferred embodiment, the adjusting screw and the digital display apparatus can be configured in such a way that a latching step is overcome by each adjustment by a millimeter or $1/10$ of a millimeter, with the result that the machine operator also receives acoustic and possibly haptic feedback.

In another preferred embodiment of the present invention, the adjusting unit is connected fixedly to the second transport device at least via a U-shaped connection piece. As a rule, in each case the lower and upper ends of the two guide bars are screwed in each case into a U-shaped connection piece which is fastened by way of its two free ends to the second transport apparatus (that is to say, as a rule to the roller sorter). This configuration allows best for the spatial conditions and at the same time ensures high stability.

As has already been addressed above, the first transport device is preferably a running rail and the second transport device is preferably a roller sorter.

Finally, the running rail preferably has a protective apparatus on its underside. The protective apparatus serves as a rule as head protection and consists of a preferably narrow profile which has a rounded portion on the sides. The rounded portions can have a rubber coating on their outer side.

BRIEF DESCRIPTION OF THE DRAWINGS

One exemplary embodiment of the present invention is illustrated with regard to improved clarity in the appended drawings, in which:

FIG. 4 shows a front view of the rail unit of an adjusting system according to the invention.

DETAILED DESCRIPTION OF THE INVENTION

Figure 1:
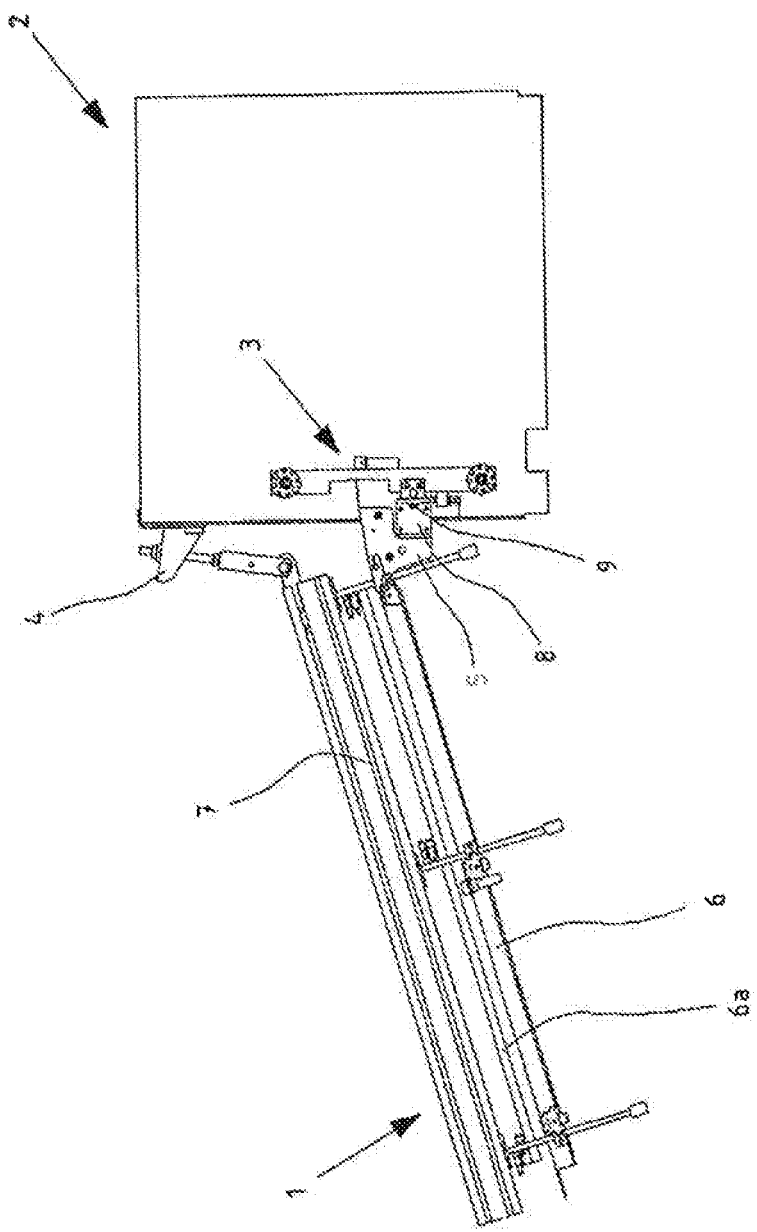
FIG. 1 shows a side view of an adjusting system according to the prior art with an outlet unit which is screwed on fixedly.

The known adjusting system according to FIG. 1 first of all comprises a running rail 1 and a roller sorter 2 which are connected fixedly to one another via a cross guide 3 and via a separate setting device 4.

The running rail 1 comprises a rail 6 with an outlet unit 5, and a vertical guide 6a which is arranged above the rail 6 for the preforms which come from the roller sorter 2. In addition, a profile 7 is installed above the vertical guide 6a, on which profile 7 one end of the setting device 4 is articulated. The other end of the setting device 4 is supported on the machine frame of the roller sorter 2.

The outlet unit 5 is screwed fixedly to the roller sorter 2 by means of the cross guide 3. In order to change the vertical setting of the outlet unit 5 and of the rail 6 with respect to the roller sorter 2, the machine operator has to loosen the screw 9 which is guided in a slot of the angle element 8 and move the outlet unit 5 together with the rail 6 upward or downward and subsequently tighten the screw 9 again. Depending on the extent of the vertical change, the setting device 4 which is articulated on the profile 7 and as a rule is configured in the form of a threaded bolt at its end on the roller sorter side optionally also has to be adjusted. To this end, in each case suitable tools are required.

Since changeovers to different preform sizes in practice have to be performed several times a day in some circumstances, significant changeover and down times sometimes occur in this type of adjusting system. In addition, the reproducibility of the individual settings depends solely on the skill of the respective engineer or machine operator.

Figure 2:
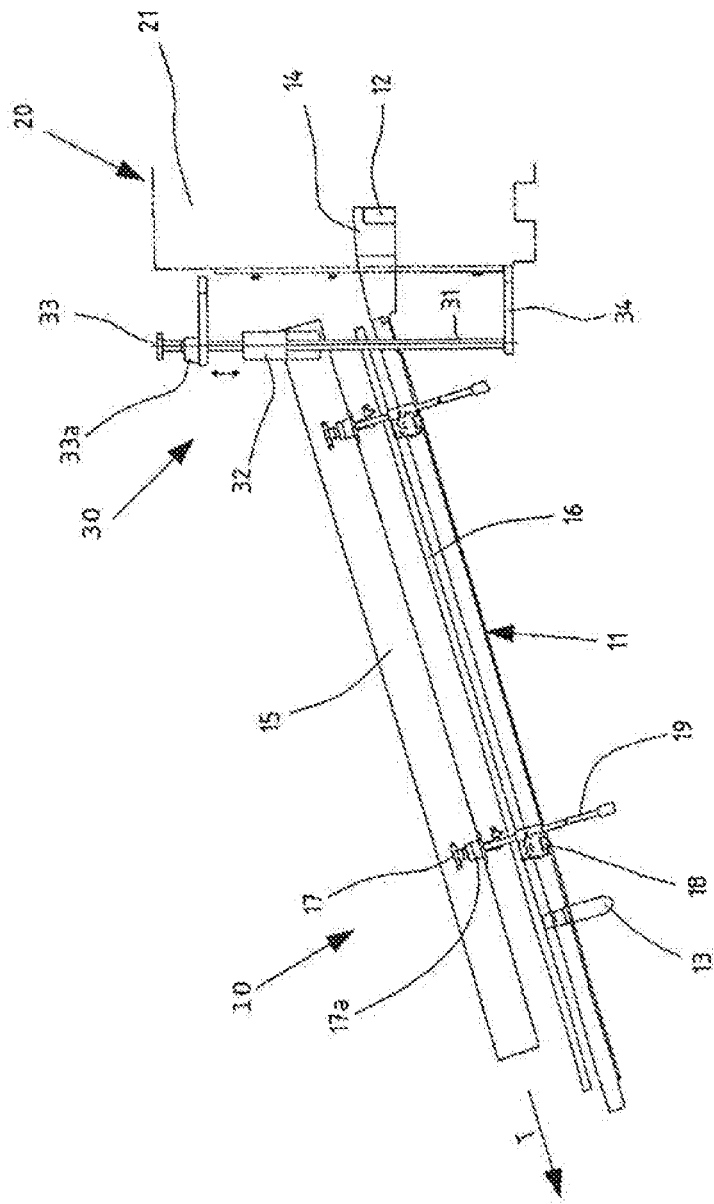
FIG. 2 shows a side view of an adjusting system according to the invention with a loose outlet unit.

FIG. 2 then shows a system according to the invention for adjusting at least the vertical setting between a first transport device 10 (that is to say, as a rule a running rail) and a second transport device 20 (that is to say, as a rule a roller sorter) in a transport section for preforms 13 for plastic containers. The first transport device 10 is inclined in the transport direction T.

Here, the running rail 10 has at least one outlet unit 12 for accepting preforms 13 from the roller sorter 20 and a rail unit 11 for further transport of the preforms 13. Here, the outlet unit 12 is firstly connected (as a rule, fixedly) to the rail unit 11 and is secondly arranged such that it can be moved freely with respect to the roller sorter 20. As can be seen, the outlet unit 12 protrudes here to a certain extent into the machine frame 21 of the roller sorter 20.

However, the outlet unit 12 is not in contact with the roller sorter 20, since this might possibly lead to undesired incorrect adjustment on account of forces which are possibly introduced from the roller sorter 20 into the outlet unit 12. In addition, the outlet unit 12 has a curvature 14 or curved support face for the preforms 13 or the collars of the preforms, in order that the latter can be transported further in a non-braked or non-disrupted manner when they fall from the transport rollers or rolls (not shown) of the roller sorter 20 onto the outlet unit 12.

The first and the second transport devices 10, 20 are connected to one another (as a rule, fixedly) via an adjusting unit 30, it being possible for the height at least of the outlet unit 12 (and optionally of the rail unit 11 which is connected to it) so be adjusted with respect to the second transport device 20 by means of the adjusting unit 30.

For this purpose, the adjusting unit 30 has a movable carriage 32 which is mounted on guide bars 31. The movable carriage 32 can be actuated, that is to say can be moved upward or downward, via an adjusting screw 33 at the upper end of the adjusting unit. The adjusting screw 33 is provided with a digital display apparatus 33a, which ensures precise reproducibility of the individual settings for the different preform sizes.

The guide bars 31 extend between two U-shaped connection pieces 34, by way of which the adjusting unit 30 is fastened fixedly to the roller sorter 20. The movable carriage 32 is connected, preferably screwed, to the support profile 15 of the running rail 10. The support profile 15 is connected to the rail unit 11 via the securing bars 19, the support profile 15 being installed on transverse struts 19a (cf. FIG. 4) which extends between two securing bars 19 which lie opposite one another.

The adjusting screw 17 with the digital display apparatus 17a for setting the vertical guide 16 is also arranged on the transverse struts 19a. The vertical guide 16 is arranged between the support profile 15 and the rail unit 11 for the preforms 13. Moreover, the width setting means 18 for the rail unit 11 and the outlet unit 12 is provided on the securing bars 19.

Figure 3:
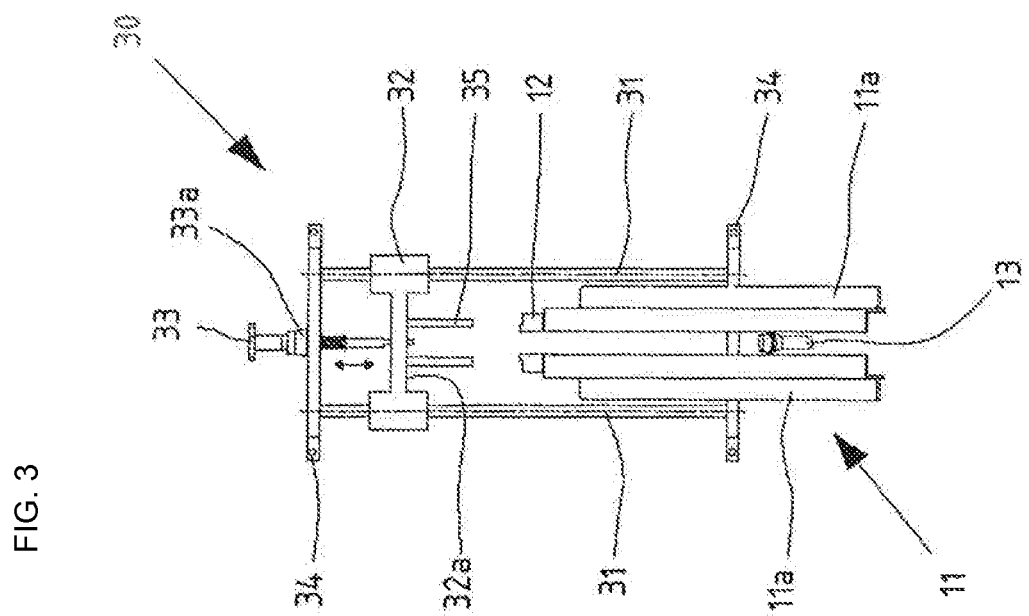
FIG. 3 shows a front view of an adjusting system according to the invention, in particular of the adjusting unit thereof.

The front view according to FIG. 3 illustrates, in particular, the method of operation of the adjusting unit 30. Its frame consists of the two U-shaped connection pieces 34, by way of which the adjusting unit 30 is fastened above and below the outlet unit 12 to the roller sorter 20, and the guide bars 31 which extend between the two U-shaped connection pieces 34. The movable carriage 32 which as a rule has an H-shaped configuration is mounted on the guide bars 31.

The carriage 32 is moved by the adjusting screw 33 which extends through the upper U-shaped connection piece 34 and through a corresponding threaded hole in the transverse bar 32a of the H-shaped carriage 32. The adjusting screw 33 has a digital display apparatus 33a and is thus capable of moving the movable carriage 32 vertically over 1 mm, preferably ¹⁄₁₀ millimeter, snap-in latches. Two small plates 35 protrude from the underside of the transverse bar 32a of the movable carriage 32, by means of which small plates 35 the movable carriage 32 is connected, preferably screwed, to the support profile 15.

The outlet unit 12 which is adjoined by the two Z-profiles 11a of the rail unit 11 can be seen between the two guide bars 31 and below the small plates 35. A preform 13 is guided between the two Z profiles 11a, which preform 13, as customary, rests with its collar in each case on the upper side of the Z-profiles 11a.

FIG. 4 shows a sectional view through the first transport unit 10 (without the support profile 15). Here, in particular, the adjustment of the vertical guide 16 and the adjustment of the width setting means 18 are illustrated.

The vertical guide 16 which as a rule is configured as a C-profile is operatively connected to the adjusting screw 17 via a cross bar 16a which is arranged below the transverse strut 19a which connects the securing bars 19 to one another. The adjusting screw 17 once again has a digital display apparatus 17a and is thus optionally capable of moving the vertical guide 16 vertically over 1 mm, preferably 1/10 millimeter, snap-in latches. The vertical guide 16 is preferably arranged closely above the opening of the preforms 13.

The adjusting screws 18 for setting the guide gap S which is formed by the Z-profiles 11a or for setting the width are installed on the securing bars 19 and are connected to the Z-profiles 11a. The guide gap S is as a rule somewhat smaller than the diameter of the collar 13a of the respectively guided preform 13. The adjusting screws 18 likewise have digital display apparatuses 18a and are thus capable of moving the Z-profiles 11a horizontally over 1 mm, preferably 1/10 millimeter, snap-in latches.

A head protection apparatus 40 is installed at the lower end of the securing bars 19. Said head protection apparatus 40 consists of a preferably narrow profile 42 which has a rounded portion 42 on the sides. In this way, the risk of injury for the machine operator and other persons can at any rate be reduced.

LIST OF DESIGNATIONS

1 Running rail
2 Roller sorter
3 Cross guide
4 Setting device
5 Outlet unit
6 Rail
6a Vertical guide
7 Profile
8 Angle element
9 Screw
10 First transport device (running rail)
11 Rail unit
11a Z-profiles
12 Outlet unit
13 Preform
13a Collar
14 Curvature
15 Support profile
16 Vertical guide
16a Cross bar
17 Adjusting screw
17a Digital display apparatus
18 Width setting/adjusting screw
18a Digital display apparatus
19 Securing bars
19a Transverse struts
20 Second transport device (roller sorter)
21 Machine housing
30 Adjusting unit
31 Guide bars
32 Movable carriage
32a Transverse bar
33 Adjusting screw
33a Digital display apparatus
34 U-shaped connection piece
35 Small plate
40 Head protection
41 Profile (narrow)
42 Rounded portion
S Guide gap
T Transport direction

The invention claimed is:

1. A system for adjusting at least the vertical setting between a running rail (10) and a roller sorter (20) in a transport section for preforms for plastic containers, the running rail (10) having at least one outlet unit (12) which receives preforms (13) coming from the roller sorter (20) and a rail unit (11) which further transports the preforms (13), the outlet unit (12) being connected to the rail unit (11) and being freely moveable with respect to the roller sorter (20), and the running rail (10) and the roller sorter (20) being connected to one another via an adjusting unit (30),
    wherein the height of at least the outlet unit (12) being adjustable with respect to the roller sorter (20) by means of the adjusting unit (30), and
    wherein the adjusting unit (30) has a movable carriage (32) which is connected to the free end of a support profile (15) of the running rail (10) facing the roller sorter (20), the support profile (15) being installed above the rail unit (11) of the running rail (10) and wherein the movable carriage (32) is slidably guided along two parallel guide bars (31) being arranged on either side of the running rail (10).

2. The system as claimed in claim 1, wherein the outlet unit (12) of the running rail (10) has a curvature (14).

3. The system as claimed in claim 1, wherein the movable carriage (32) can be moved along the guide bars (31) via an adjusting screw (33) being centrally arranged on a U-shaped connection piece (34) by means of which the adjusting unit (30) is fastened at the roller sorter (20).

4. The system as claimed in claim 3, wherein the adjusting screw (33) is provided with a digital display (33a).

5. The system as claimed in claim 3, wherein the adjusting screw (33) of the adjusting unit (30) runs between two guide bars (31), along which the movable carriage (32) is moved.

6. The system as claimed in claim 1, wherein the movable carriage (32) has a substantially H-shaped configuration.

7. The system as claimed in claim 1, wherein the running rail (10) has an adjustable vertical guide (16).

8. The system as claimed in claim 7, wherein the vertical guide (16) has an adjusting screw (17) which is preferably provided with a digital display (17a).

9. The system as claimed in claim 1, wherein the running rail (10) has a width setting means (18) which is preferably provided with a digital display (18a).

* * * * *